(12) United States Patent
Jin

(10) Patent No.: US 6,809,465 B2
(45) Date of Patent: Oct. 26, 2004

(54) ARTICLE COMPRISING MEMS-BASED TWO-DIMENSIONAL E-BEAM SOURCES AND METHOD FOR MAKING THE SAME

(75) Inventor: Sungho Jin, San Diego, CA (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 10/350,614

(22) Filed: Jan. 24, 2003

(65) Prior Publication Data
US 2004/0036407 A1 Feb. 26, 2004

Related U.S. Application Data

(60) Provisional application No. 60/405,561, filed on Aug. 23, 2002.

(51) Int. Cl.[7] .................................................. H01J 1/02
(52) U.S. Cl. ...................... 313/310; 313/495; 313/147; 378/122
(58) Field of Search ................................. 313/495–497, 313/439, 413, 414, 459, 309, 147; 345/74.1, 75.2; 378/98.6, 122; 315/169.3

(56) References Cited

U.S. PATENT DOCUMENTS

| | | | | |
|---|---|---|---|---|
| 4,149,076 A | * | 4/1979 | Albert ........................ | 378/98.6 |
| 6,069,599 A | * | 5/2000 | Py et al. ...................... | 345/74.1 |
| 6,103,305 A | * | 8/2000 | Friedmann et al. ....... | 427/249.7 |
| 6,411,020 B1 | * | 6/2002 | Yaniv et al. ................. | 313/310 |
| 6,545,425 B2 | * | 4/2003 | Victor ...................... | 315/169.3 |

* cited by examiner

*Primary Examiner*—Vip Patel
*Assistant Examiner*—Glenn Zimmerman
(74) *Attorney, Agent, or Firm*—Lowenstein Sandler PC

(57) ABSTRACT

In accordance with the invention, an electron beam source for exposing selected portions of a surface to electrons comprises a plurality of nanoscale electron emitters and, associated with each electron emitter, a directional control element to direct the emitter toward a selected portion of the surface. In a preferred embodiment, the emitters are nanotubes or nanowires mounted on electrostatically controlled MEMS directional control elements. An alternative embodiment uses electrode directional control elements.

16 Claims, 8 Drawing Sheets

ARTICLE COMPRISING MEMS-BASED TWO-DIMENSIONAL E-BEAM SOURCES AND METHOD FOR MAKING THE SAME

CROSS REFERENCE TO RELATED APPLICATION

This application claims the benefit of U.S. Provisional Application Ser. No. 60/405,561 filed by Sungho Jin on Aug. 23, 2002, which application is incorporated herein by reference.

FIELD OF INVENTION

The present invention relates to electron beam sources and, in particular, to electron beam sources utilizing micro-electro-mechanical-systems (MEMS) devices and to methods for making the same. The invention is particularly useful for electron beam displays and for x-ray imaging.

BACKGROUND OF THE INVENTION

Display devices play important roles in modern information and entertainment technologies such as computer monitors and TVs. The resolution requirement for typical computer monitors and TV screens is relatively modest, as human eyes can not resolve images finer than ~100 micrometers. For display devices that humans will see at closer distances, for example, head-mounted displays, camera viewfinders, or wearable personal computing devices, a much higher resolution on the order of ~3 micrometers is required. These head-mounted displays allow the free use of hands, and are thus useful for a number of unique applications such as a mobile wearable computer, a head-mounted display for detecting land mines, virtual reality traveling, or remotely guiding mechanical repair or even a surgical operation.

To provide a two-dimensional e-beam source, parallel beam illumination has to take place simultaneously at many different locations on the surface to be exposed. Two-dimensional, x-y addressable array of electron field emission sources include the cold tip cathode array described by C. A. Spindt, C. E. Holland, A. Rosengreen, and I. Brodie, in "Field emitter array development for high frequency operation," *J. Vac. Sci. Technol. B*, vol. 11, pp. 468–473, 1993, and the nanotube field emission display cathodes described by W. B. Choi, et al. in "Carbon-Nanotube Based Field-Emission Displays for Large Area and Color Applications", *Journal of Information Display*, Vol. 1, No. 1, p. 59, December 2000. In theory such arrays may be used to achieve simultaneous supply of various e-beams. However, it would be impractical to make each cold cathode structure sufficiently small (on the order of ~10–1000 nanometers) to obtain a display with a 10–1000 nm resolution. Even if such a nanoscale cathode structure would be fabricated, the number of cathode cells and associated lead wires required for x-y addressing would be astronomical. To produce a two-dimensional e-beam array for a display size of 12×12 inch area, it would take about $10^{12}$–$10^{14}$ cathodes and wire connections. The fabrication of display devices having ~3 micrometer pixel display cell size, as compared to the present cell size of ~100 micrometers or larger, would be significantly more complex and expensive. Accordingly it would be desirable to be able to design and fabricate such high resolution display devices by using industrially viable and inexpensive techniques.

SUMMARY OF THE INVENTION

In accordance with the invention, an electron beam source for exposing selected portions of a surface to electrons comprises a plurality of nanoscale electron emitters and, associated with each electron emitter, a directional control element to direct the emitter toward a selected portion of the surface. In a preferred embodiment, the emitters are nanotubes or nanowires mounted on electrostatically controlled MEMS directional control elements. An alternative embodiment uses electrode directional control elements.

BRIEF DESCRIPTION OF THE DRAWINGS

The nature, advantages and various additional features of the invention will appear more fully upon consideration of the illustrative embodiments now to be described in detail with the accompanying drawings. In the drawings:

FIG. 3(*b*) shows a display where the gate is attached on the support frame of a MEMS structure;

FIG. 4(*b*) illustrates a high resolution display device wherein the e-beam is steered by controlling the asymmetry of the electric or magnetic field of the electrodes;

DETAILED DESCRIPTION

In one embodiment, the present invention provides a MEMS (micro-electro-mechanical system) arrangement to bring up the cathode cell size to a more practical range while maintaining the ~10–1000 nm scale resolution in the two-dimensional e-beam illumination. By combining the MEMS and the nano technology, a novel two-dimensional e-beam illumination technology is accomplished.

The inventive apparatus consists of subdivided MEMS cells. A movable MEMS component in each MEMS cell is electrostatically or magnetically actuated to tilt/rotate three-dimensionally so that the electron trajectory from an attached nanoscale field emitter (e.g., one or more nanowires or nanotube cold cathodes) can be scanned over the entire cell area, e.g., a 10 micrometer diameter of square area. A nanoscale emitter as used herein refers to an emitter having an extent of less than a micrometer in at least two of the three dimensions.

Figure 1:
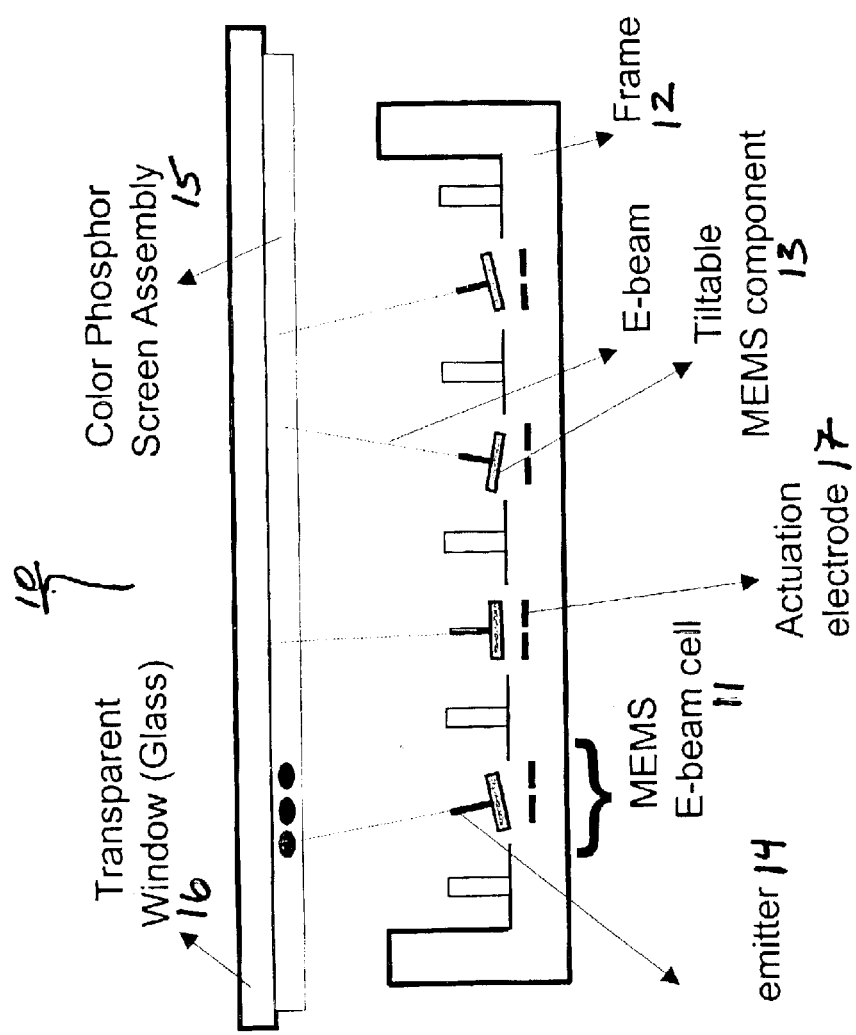
FIG. 1 schematically illustrates a-high-resolution MEMS based field emission display according to the invention.

Referring to the drawing, FIG. 1 schematically illustrates an ultra-high-resolution, flat panel display 10 comprising an array of MEMS cells 11 within a frame 12. Each cell 11 contains a movable and scannable component 13 with one or several nanoscale electron field emitters 14. A phosphor screen assembly 15 with red-green-blue colors and a transparent glass window 16 are added in front of the electron beam. Phosphor screen technology is well known. (For example see J. A. Castellano, *Handbook of Display Technology*, Academic Press, New York, 1992.)

The diameter of an e-beam arriving at the phosphor screen in the inventive display device will be of the order of 10–1000 nm depending on the distance and focusing mechanisms used. Thus a sharp, high-density-pixel display image can be obtained with a resolution of better than 3 micrometers, preferably better than 1 micrometer, even more preferably better than 100 nm. For color displays, the phosphor screen assembly can contain a distribution of high resolution triads of red-green-blue dots or stripes, with the resolution of phosphor dots preset corresponding to the desired display resolution. For high resolution displays the desired dimension of the phosphor spots is typically less than 30 micrometers, preferably less than 10 micrometers, even more preferably less than 3 micrometers. The MEMS based steerable electron beam is programmed and operated to strike the phosphor dots corresponding to the desired color at the desired location. The neighboring MEMS-steered e-beams may be programmed to have slightly overlapping coverage in order to ensure smooth transition of image near the boundary regions.

The preferred electron emitters are carbon nanotubes. Carbon nanotubes are known to be powerful electron field emitters (see Zhu, et al, "Large Current Density from Carbon Nanotube field Emitters", *Applied Physics Letters*, Vol.75, No. 6, p. 873, August 1999). The electrons emitted from the tips of carbon nanotubes are utilized in the two-dimensional, steerable e-beam sources. Since the field emission of electrons is most effective in vacuum where collisions with atoms or ions are minimized, the device is preferably operated at a vacuum level typically used for field emission display.

The preferred directional control elements are MEMS cells 11. The display comprises an array of MEMS cells 11, and each of the MEMS cells 11 contains a movable disk component 13 of any shape (circular, square, triangular, etc.). The tilting of the movable disk 13 in each cell and hence the trajectory of field emitted electrons from the nano emitter 14 attached on the movable disk is controlled to any desired angle by applying a varying intensity of electric fields to electrodes 17 located adjacent the disk. Such a tilting technology for MEMS movable components has been established in recent years. See U.S. Pat. No. 6,201,631 by Greywall (Mar. 13, 2001), U.S. Pat. No. 6,028,689 by Michalicek et al. (Feb. 22, 2000), and U.S. Pat. No. 5,629, 790 by Neukermans et al. (Mar. 13, 1997), each of which is incorporated herein by reference.

The MEMS structure illustrated in FIG. 1 can be fabricated by using surface micro-machining such as MUMPS (Multi User MEMS Processing System) process, by bulk micro-machining such as the SOI (silicon-on-insulator) process, or by the LIGA process (x-ray lithography and electrodeposition). Such MEMS fabrication processes are described in detail in the literature. See, for example, Marc Madou, *Fundamentals of Microfabrication*, CRC Press, New York 1997, and Gregory T. A. Kovacs, *Micromachined Transducers—Source Book*, McGraw Hill, N.Y. 1998. The MEMS structure can be made of a number of alternative materials including polysilicon, single crystal silicon, silicon carbide, diamond or metal.

On each movable disk 13, is disposed a single nanoscale electron field emitter 14 or a group of several emitters (if a somewhat broader electron beam is desired) The emitter is vertically oriented as a source of a vertically scanning e-beam. The field emitter 14 is preferably a carbon nanotube, but the use of nanowires, sharp tips such as patterned silicon tips, or emitters of negative electron affinity material such as CVD diamond is not excluded. Carbon nanotubes grown on silicon pyramid tips may also be used. See U.S. Pat. No. 6,401,526 issued to Dai et al. on Jun. 11, 2002 which is incorporated herein by reference. To maintain high resolution with a minimal waste of space on the device surface, the nano emitter can be grown directly on the surface of the disk 13, for example, by utilizing nano-patterned nucleation (or catalyst) sites. Even a single nanotube is capable of providing a very large emission current density of as high as ~$10^8$ $A/cm^2$.

Figure 2:
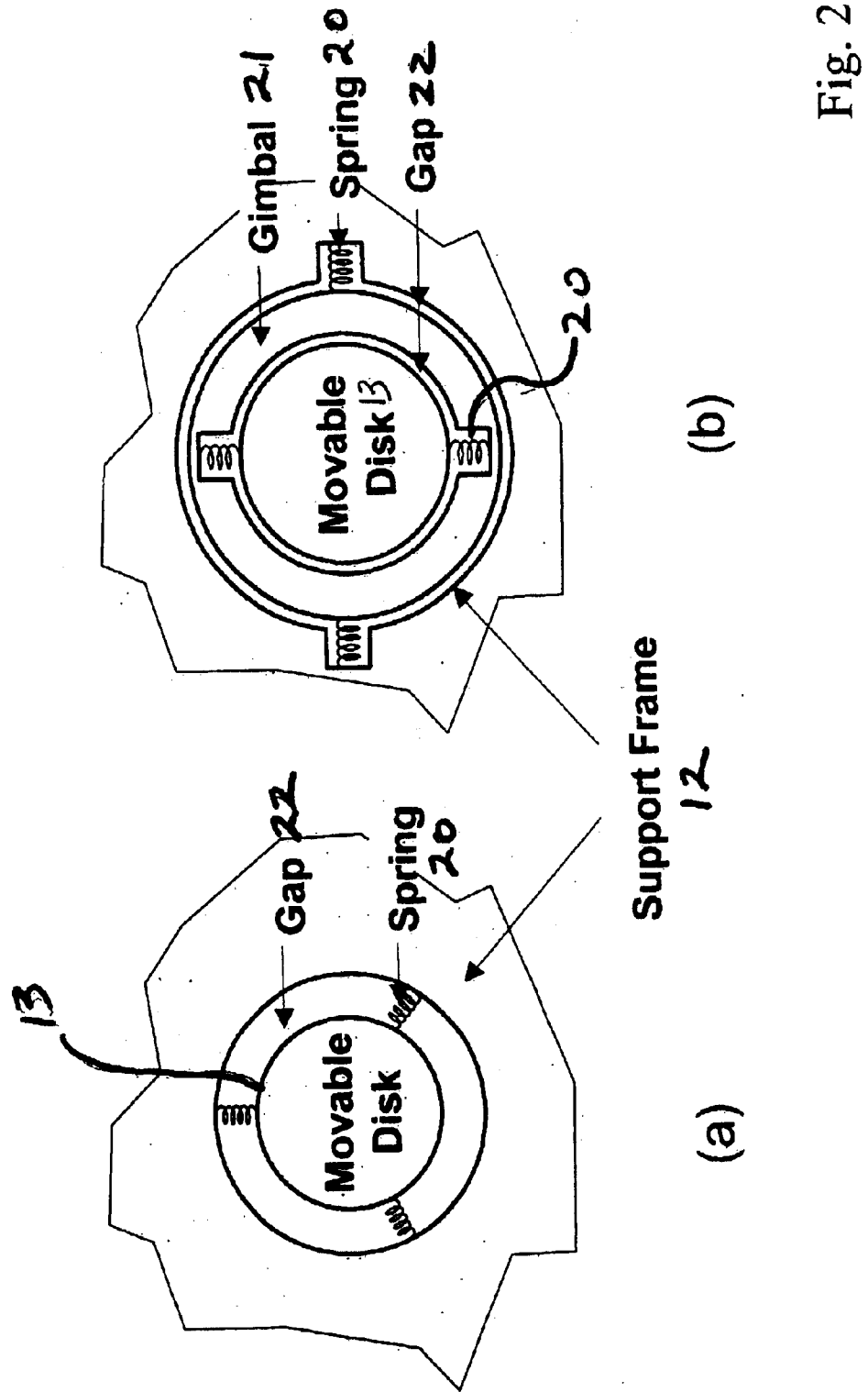
FIGS. 2(*a*) and 2(*b*) represent exemplary movable disk directional control elements for directing the trajectory of electrons emitted from nanoscale electron emitters.

FIGS. 2(*a*) and 2(*b*) illustrate exemplary tiltable disk structures 13 useful for the structure of FIG. 1. In FIG. 2(*a*), the disk 13 is coupled to the frame 12 by resilient elements 20. In FIG. 2(*b*) the disk 13 is resiliently coupled to a movable gimbal 21 which, in turn, is resiliently coupled to frame 12 by resilient members (springs) 20. A gap 22 separates the disk 13 from the frame 12 or the gimbal 21. Other types of tilt/rotate designs such as using torsional bars can also be used. The movable disk, and hence the pointing direction of the nanotube emitter attached on it, can be tilted toward any direction by independent control of the electrostatic potentials applied between the movable disk and each of the electrodes (17 of FIG. 1). Alternatively, instead of electrostatic actuation to tilt the movable disk, magnetic actuation can be used by adding a layer of magnetic material on the movable disk. Instead of applying a potential (voltage) onto electrodes, an electrical current can be applied to solenoids or thin/thick film coils to induce magnetic attraction or repulsion force on the movable component. Alternatively, other types of MEMS actuation such as piezoelectric or thermal actuation can be used.

While a simple diode structure consisting of a cathode (e.g., the nanotube field emitter 14) and an anode (in the phosphor screen assembly 15 can be adapted, easier control of electron emission is provided by a triode structure including a gate electrode near the cathode. A gate aperture placed near the tip of carbon nanotubes for ease of extracting the electrons, may also be combined with additional electrode layers stacked to serve as optical lenses for e-beam focusing. Either electrostatic or magnetic focusing may be utilized.

Figure 3:
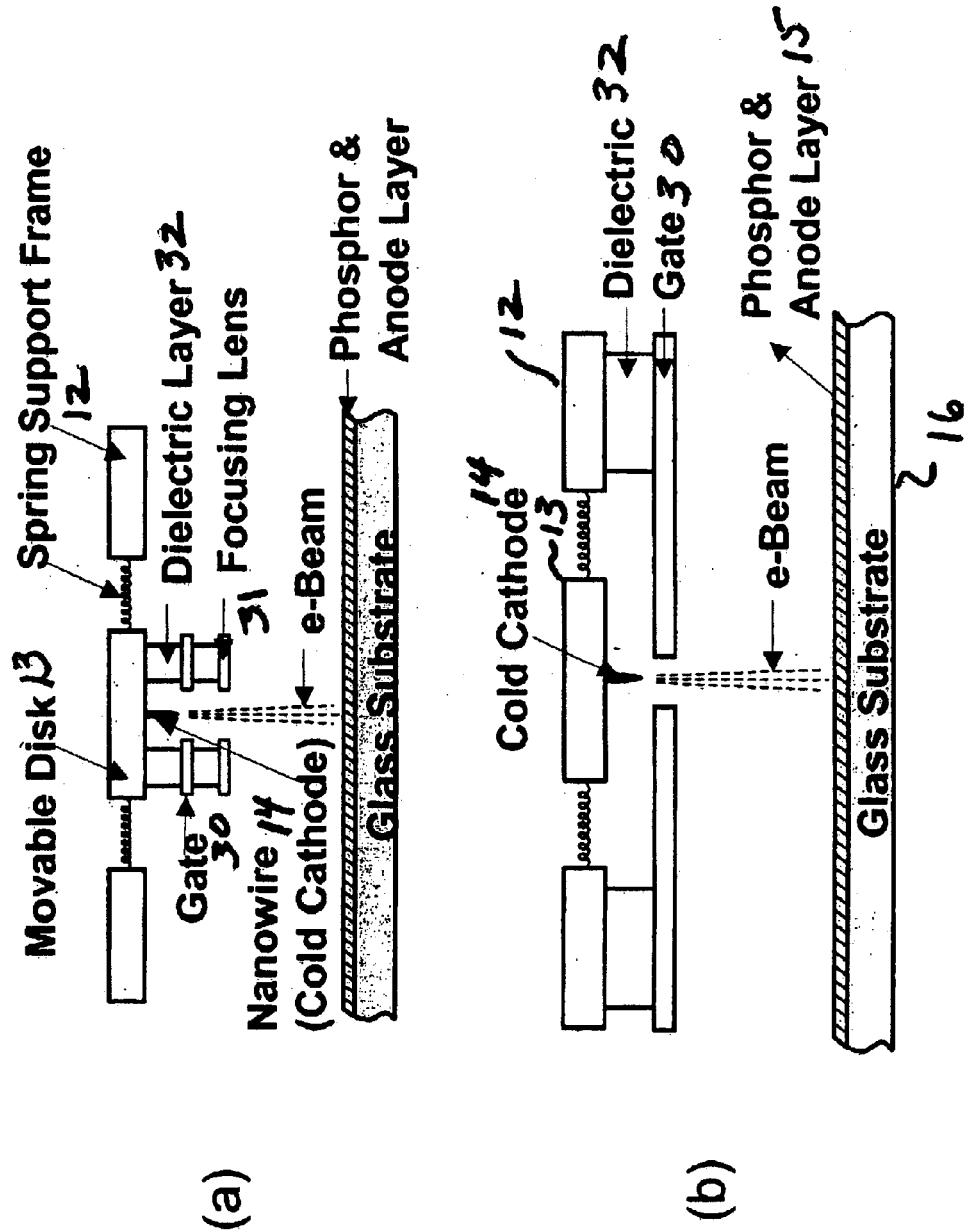
FIG. 3(*a*) shows an exemplary high resolution display wherein the electron-drawing gate and beam focusing lens are placed directly on a movable disk.

FIGS. 3(*a*) and 3(*b*) illustrate advantageous structures with gates. In FIG. 3(*a*), a gate 30 and a focusing lens 31 are fabricated on each movable disk 13 using dielectric spacers 32. An alternative structure shown in FIG. 3(*b*) is to attach the gate 30 to the support frame 12 instead of on the movable disk 13. The latter is advantageous where the angle range of the intended scanning is relatively small, e.g., less than ~10 degrees away from the vertical center line. The phosphor/conductive anode layer 15 is shown on transparent substrate 16 (e.g., a glass plate).

The e-beam can also be steered using only electronic controls, without any moving parts. In this alternative embodiment, the gate 30 or focusing lens 31 in FIG. 3(*a*) can be used to alter the beam direction.

Figure 4A:
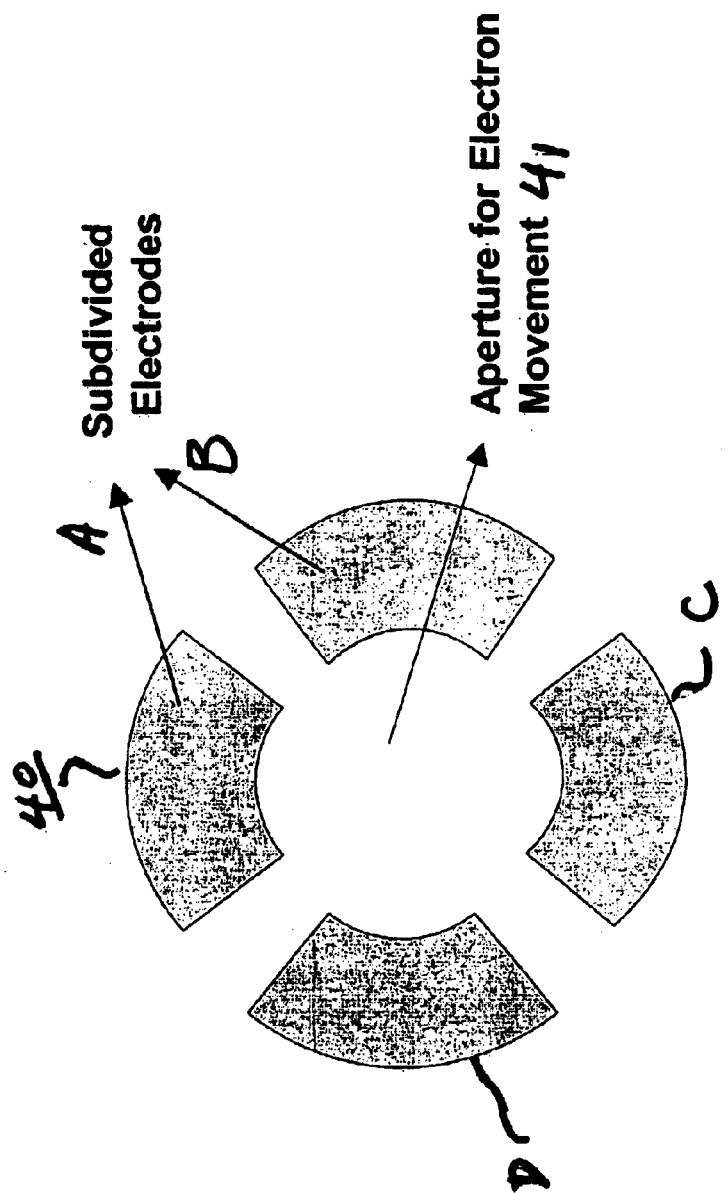
FIG. 4(*a*) schematically illustrates subdivided electrodes (or electromagnetic poles) for controlling a directional control element.

FIG. 4(*a*) illustrates such a steering electrode 40. By subdividing the gate or focusing lens electrode, e.g., as independently controllable electrode segments A, B, C, D, and applying asymmetric potentials among the electrode segments, the e-beam can be made to project through an aperture 41 toward any selected direction. The electrons tend to move toward the electrode segment with higher applied voltage. The advantage in this approach is elimination of moving components and enhanced long-term reliability.

Figure 4B:
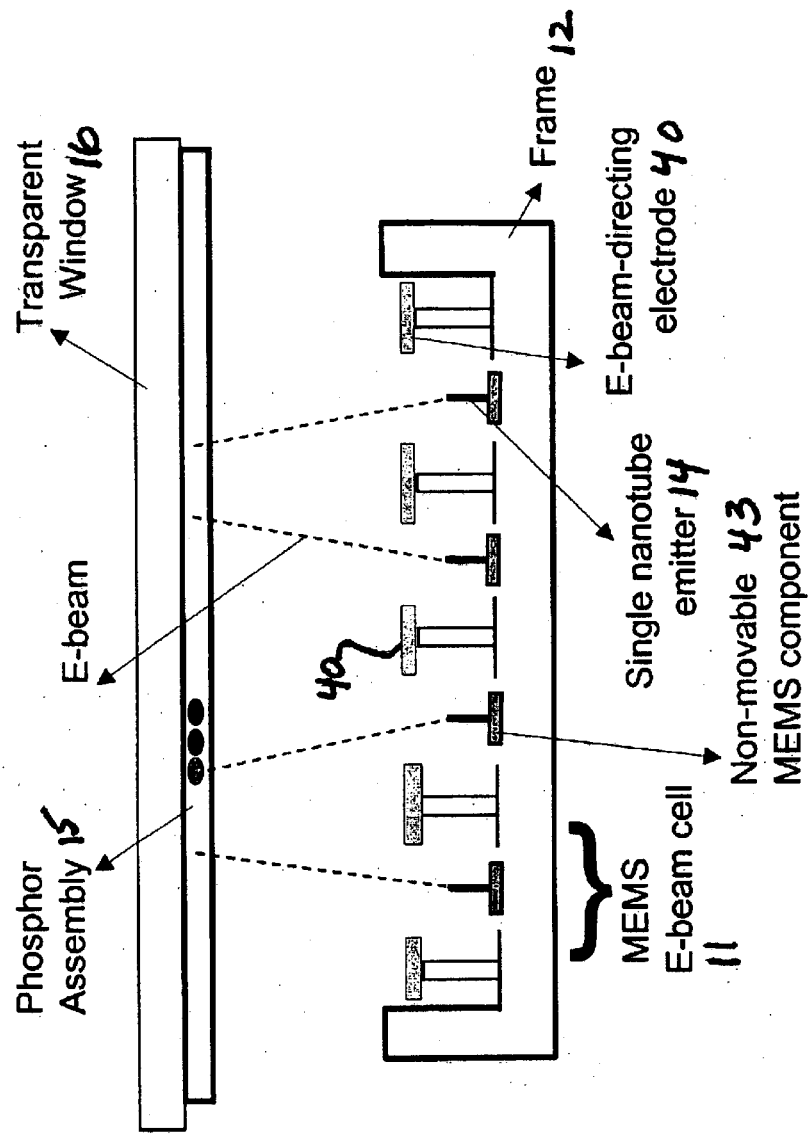

FIG. 4(b) illustrates such a device using stationary emitter supports 43 and e-beam directing electrodes 40.

As a field emitter 14, the use of a single nanotube for each cell 11 is preferred to a multiplicity of nanotubes for a very sharp, ultrahigh resolution display with a pixel resolution of less than ~100 nm. With a single nanotube the beam spread and perpendicular momentum is minimized. However, if a lesser ultrahigh resolution of ~15 micrometer is acceptable (as is sufficient for high resolution head-mountable or camera viewfinder displays), the e-beam size can be broader, and the nano emitter 14 does not have to be a single nanoscale emitter. Several nanowires/nanotubes can be placed as a group in each cell. If it is desired to improve the focusing of e-beams from multiple nanotube sources, secondary electrons may be utilized to lower the electron energy of the beam. For example the field emitted electrons can be reflected off a wall of material with a high secondary electron emission coeffecient (such as diamond).

The desired size of each MEMS cell can be determined based on the needs for high display resolution against the complexity of fabricating many small cells. The desired cell dimension is typically 200 micrometers or less, preferably less than 50 micrometers, and even more preferably less than 10 micrometers wide. The desired display pixel resolution is advantageously less than 10 micrometers, preferably less than 5 micrometers, even more preferably less than 2 micrometers.

The inventive, high resolution displays 10 can be useful for a number of applications such as a viewfinder of a camera or a head-mounted display as for a wearable computer. Such displays can be used for virtual reality traveling, remotely guided mechanical repair, or even surgery using telecommunication guidance.

Figure 5:
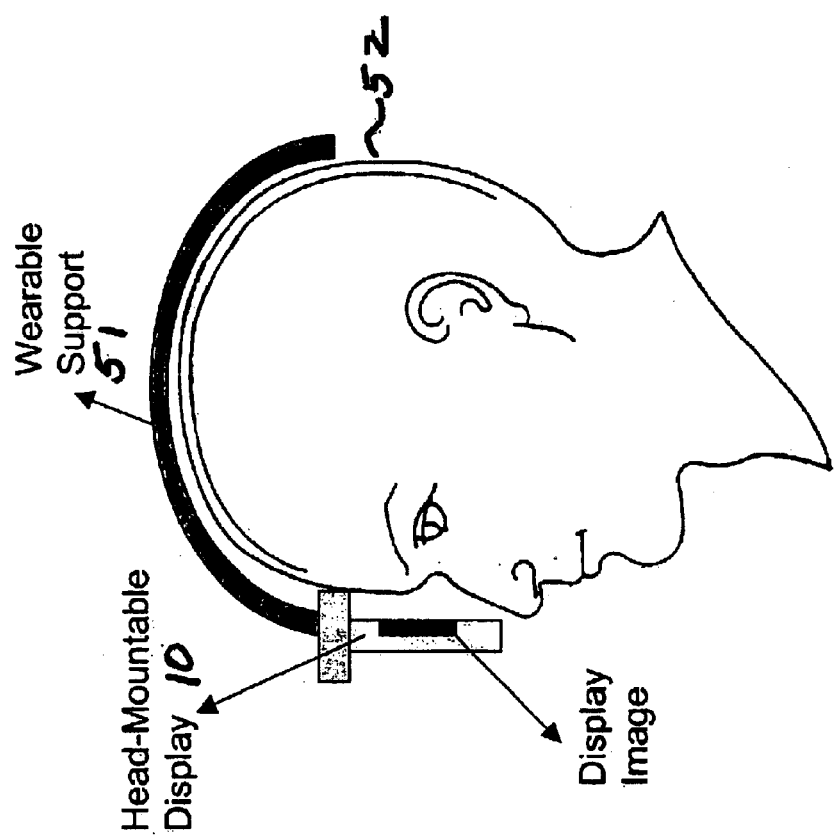
FIG. 5 schematically illustrates an exemplary high-resolution, head mountable display according to the invention.
Figure 6:
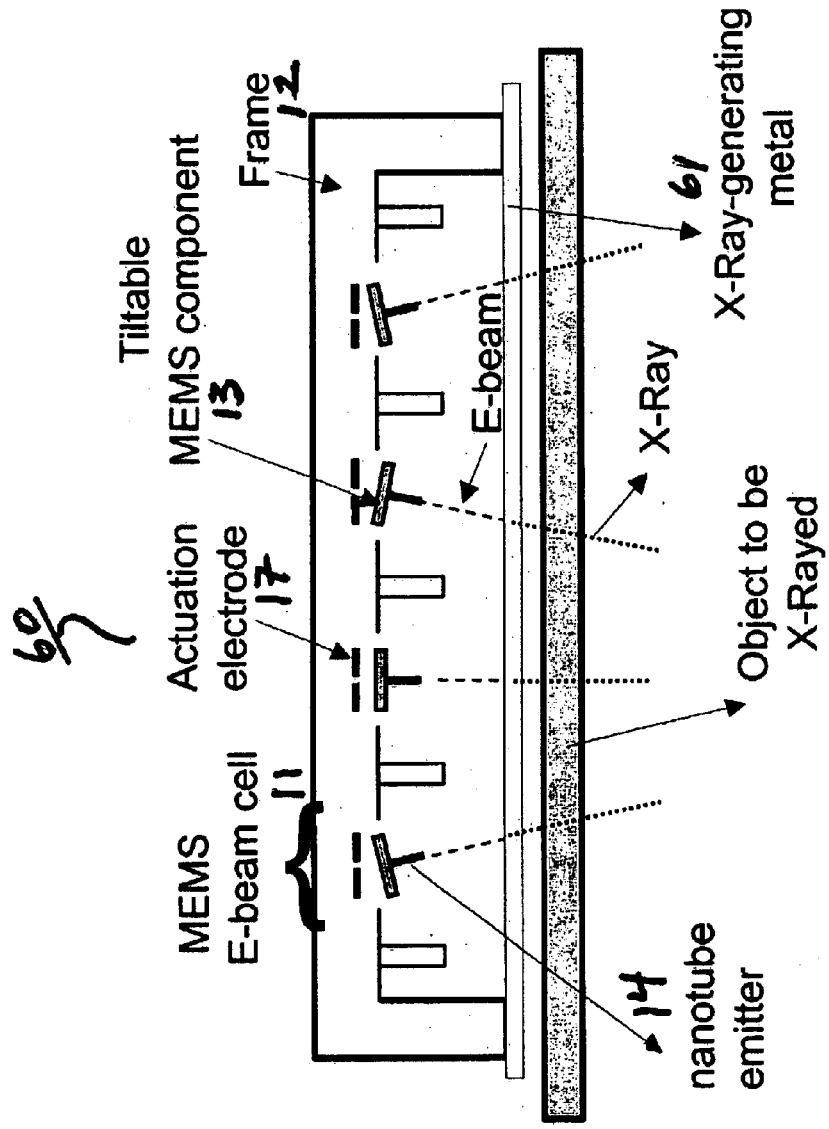
FIG. 6 shows an exemplary embodiment of two-dimensional, flat panel x-ray source according to the invention.

FIG. 5 illustrates a head-mounted display 50 comprising a display 10 held in position for viewing by a wearable support 51 (e.g., a cap) fitted to a human head 52.

The two-dimensional, flat panel MEMS e-beam source may also be modified into a high-resolution programmable x-ray source 60 by incorporating x-ray generating metal film 61 in front of the emitted electrons. The electron bombardment of the metal layer or metal structure 61 from each of the nanotube emitter generates an x-ray beam with characteristic wavelength.

Figure 7:
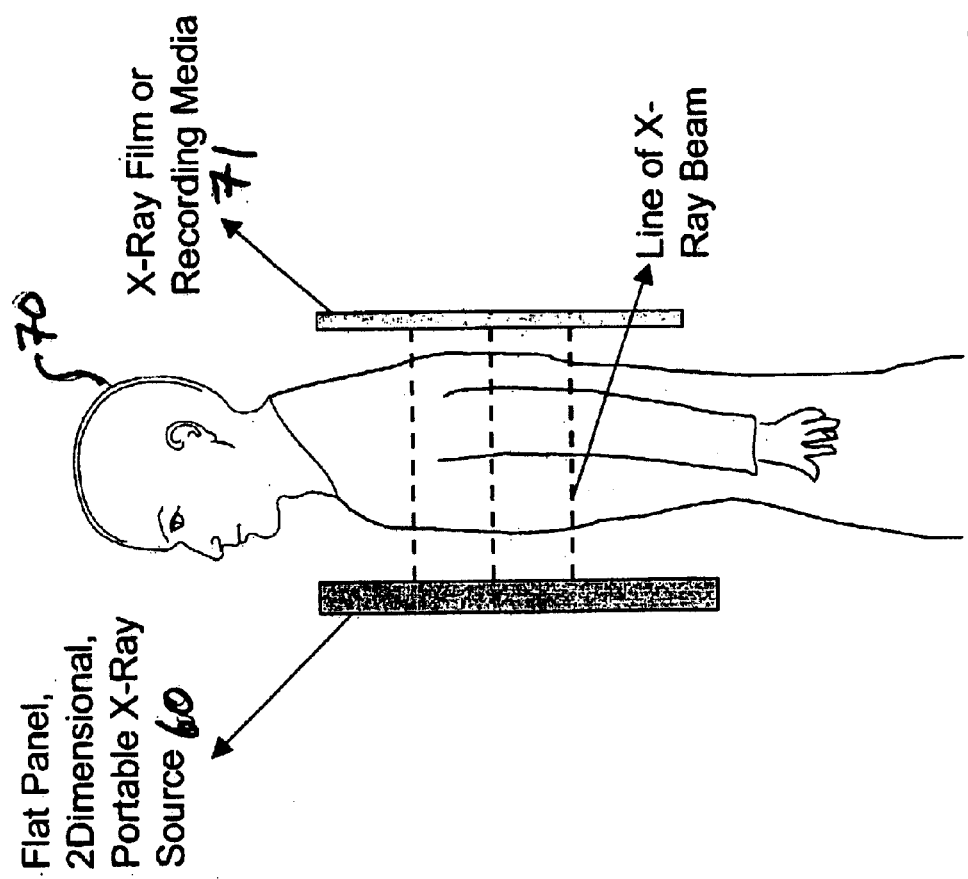
FIG. 7 schematically illustrates an application of the flat panel x-ray source of FIG. 6 for diagnostic use; and It is to be understood that the drawings are for purposes of illustrating the concepts of the invention and are not to scale.

FIG. 7 shows how such a flat panel, two dimension x-ray source 60 in combination with an x-ray medium 71 can be used, for example, as a portable diagnostic tool. It can be used for on-site imaging of an accident victim 70 or a wounded soldier in the battle field. Such a device with a multiple, steerable x-ray beams can also be used for a complex analysis or treatment of tumors, bones and tissue anomaly.

The invention may also be considered as a method of exposing selected portions of a surface to electrons comprising the steps of providing an array of nanoscale electron emitters, inducing electron beams from one or more of the emitters; and separately directing the beams from the emitters to the selected portions of the surface. The beams can be directed by separately controlling the orientations of the nanoscale emitters or by deflecting the individual emitted beams.

It is understood that the above-described embodiments are illustrative of only a few of the many possible specific embodiments which can represent applications of the invention. Numerous and varied other arrangements can be made by those skilled in the art without departing from the spirit and scope of the invention.

What is claimed is:

1. A device for exposing selected portions of a surface to electrons comprising:
   a plurality of nanoscale electron emitters, each nano scale electron emitter oriented for emitting a directional beam of electrons toward the surface; and
   associated with each electron emitter a directional control element comprising a movable support element supporting the nanoscale emitter to control the direction of the emitter beam toward the selected portions of the surface.

2. The device of claim 1 wherein a directional control element comprises a plurality of electrodes adjacent a nanoscale emitter.

3. The device of claim 1 wherein the nanoscale electron emitters are selected from the group consisting of nanotubes, nanowires, bodies with pointed tips, and bodies of negative electron affinity material.

4. The device of claim 1 wherein the plurality of electron emitters are steered together to broaden the beam coverage area.

5. The device of claim 4 wherein the orientation of the movable support element is controlled by electrostatic, magnetic, piezoelectric or thermal actuation.

6. An arrangement for producing a pattern of x-rays comprising:
   a surface comprising a material that generates x-rays when exposed to an electron beam; and
   a device according to claim 1 for exposing selected portions of the surface to electrons, thereby producing the pattern of x-rays.

7. A display device comprising:
   a surface comprising a material that emits light when exposed to an electron beam; and
   a device according to claim 1 for exposing selected portions of the surface to the electrons.

8. A display device comprising:
   a surface comprising a material that emits light when exposed to an electron beam; and
   a device according to claim 1 for exposing selected portions of the surface to the electrons.

9. A display device comprising:
   a surface comprising a material that emits light when exposed to an electron beam; and
   a device according to claim 2 for exposing selected portions of the surface to the electrons.

10. The device of claim 1 wherein the nanoscale electron emitters are arranged in a linear or a two-dimensional array.

11. A method of exposing selected portions of a surface to electrons comprising the steps of:
    providing a plurality of nanoscale electron emitters;
    inducing electron beams from the emitters; and
    separately controlling the orientations of the nanoscale emitters to direct the beams to the selected portions of the surface.

12. The method of claim the beam directions are controlled by separately deflecting the emitted beams.

13. A method for producing a pattern of x-rays comprising the steps of:
    providing a layer of material that can generate x-rays from an incident electron beam; and
    exposing selected portions of the layer by the process of claim 11 generate the pattern of x-rays.

14. A method for producing a pattern of x-rays comprising the steps of:

providing a layer of material that can generate x-rays from an incident electron beam; and exposing selected portions of the layer by the process of claim 11 to generate the pattern of x-rays.

15. A method for providing an optical display comprising the steps of:

providing a layer of material that can generate light from an incident electron beam; and exposing selected portions of the layer by the process of claim to generate light in an optical display.

16. the method of claim 11 wherein the nanoscale emitters are arranged in a linear or two-dimensional array.

* * * * *